US008793350B2

(12) United States Patent
Arseneau et al.

(10) Patent No.: US 8,793,350 B2
(45) Date of Patent: Jul. 29, 2014

(54) SYSTEMS AND METHODS FOR MODIFYING CONTENT OF MOBILE COMMUNICATION DEVICES

(75) Inventors: Eric Jean-Paul Arseneau, San Diego, CA (US); Jonathan Paul Hylands, Scotland (CA)

(73) Assignee: Asset Science LLC, Santa Ana, CA (US)

( * ) Notice: Subject to any disclaimer, the term of this patent is extended or adjusted under 35 U.S.C. 154(b) by 37 days.

(21) Appl. No.: 13/043,910

(22) Filed: Mar. 9, 2011

(65) Prior Publication Data

US 2012/0233353 A1 Sep. 13, 2012

(51) Int. Cl.
*G06F 15/177* (2006.01)
*H04L 12/24* (2006.01)

(52) U.S. Cl.
CPC ........ *H04L 12/2425* (2013.01); *H04L 12/2424* (2013.01); *H04L 41/08* (2013.01); *H04L 41/0813* (2013.01)
USPC ........... 709/220; 709/203; 709/217; 709/246; 709/247; 709/248; 718/101

(58) Field of Classification Search
USPC .......................... 709/203, 217, 220, 246, 248
See application file for complete search history.

(56) References Cited

U.S. PATENT DOCUMENTS

| | | | | |
|---|---|---|---|---|
| 3,882,305 | A * | 5/1975 | Johnstone | 702/183 |
| 5,968,116 | A * | 10/1999 | Day et al. | 709/202 |
| 6,301,612 | B1 * | 10/2001 | Selitrennikoff et al. | 709/220 |
| 6,665,383 | B1 * | 12/2003 | Kim | 379/102.02 |
| 7,337,359 | B2 * | 2/2008 | Lee | 714/19 |
| 7,584,225 | B2 * | 9/2009 | Jiang et al. | 1/1 |
| 7,610,366 | B2 * | 10/2009 | Wilson, Jr. | 709/223 |
| 7,627,048 | B2 * | 12/2009 | Larsson | 375/260 |
| 7,631,043 | B2 * | 12/2009 | Burns et al. | 709/206 |
| 7,702,939 | B2 * | 4/2010 | Pan | 713/323 |

(Continued)

FOREIGN PATENT DOCUMENTS

| | | |
|---|---|---|
| JP | 2004199247 | 7/2004 |
| WO | 2005109931 | 11/2005 |
| WO | 2006104433 | 10/2006 |

OTHER PUBLICATIONS

The International Search Report, The International Searching Authority, Apr. 25, 2012 for corresponding PCT Application PCT/CA2012/000188.

(Continued)

*Primary Examiner* — Michael Y Won
(74) *Attorney, Agent, or Firm* — Dowell & Dowell, P.C.

(57) ABSTRACT

The embodiments described herein relate to systems and methods for modifying content of mobile communication devices. The method includes the steps of establishing a data communication between at least one mobile communication device from at least one manufacturer and a coordinating computer, the at least one mobile communication device having content stored therein, providing at least one content-modification module for each of the at least one mobile communication device, the content-modification module comprising a plurality of operations that are executable to modify the content of that mobile communication device, providing at least one device-specific modification procedure for that mobile communication device, the modification procedure comprising one or more selected operations of the plurality of operations of the content-modification module and an order of execution of the one or more selected operations, and executing at least one operation of the selected operations based on the at least one device-specific modification procedure to modify the content of that mobile communication device.

18 Claims, 5 Drawing Sheets

(56) References Cited

U.S. PATENT DOCUMENTS

| | | | |
|---|---|---|---|
| 7,768,422 B2 * | 8/2010 | Carmen et al. | 340/12.23 |
| 7,882,340 B2 * | 2/2011 | Ali et al. | 713/1 |
| 2002/0111995 A1 * | 8/2002 | Mansour et al. | 709/203 |
| 2003/0046674 A1 * | 3/2003 | Gentry et al. | 717/171 |
| 2003/0221114 A1 * | 11/2003 | Hino et al. | 713/189 |
| 2005/0004844 A1 * | 1/2005 | Attia | 705/26 |
| 2006/0026304 A1 | 2/2006 | Price | |
| 2010/0162374 A1 | 6/2010 | Nair | |
| 2010/0198905 A1 | 8/2010 | Mckay et al. | |
| 2010/0260000 A1 * | 10/2010 | Sridhara | 365/189.15 |
| 2010/0333167 A1 | 12/2010 | Luo et al. | |
| 2011/0093588 A1 * | 4/2011 | Karayi et al. | 709/224 |
| 2012/0151258 A1 * | 6/2012 | Lee et al. | 714/15 |
| 2012/0158665 A1 * | 6/2012 | Lee et al. | 707/678 |

OTHER PUBLICATIONS

The Written Opinion, The International Searching Authority, Apr. 27, 2012 for corresponding PCT Application PCT/CA2012/000188.

* cited by examiner

SYSTEMS AND METHODS FOR MODIFYING CONTENT OF MOBILE COMMUNICATION DEVICES

TECHNICAL FIELD

The invention relates to mobile communication devices, and in particular to systems and methods for modifying content of mobile communication devices, such as mobile phones.

BACKGROUND

Mobile communication devices are prevalent in society today. A mobile communication device usually contains certain preset content when it is delivered to a consumer. The content may include, for example, the operating system for the device (e.g. Graphical User Interface) and standard applications (e.g. calendar, alarm clock, games, etc.).

Generally, the content of the mobile communication device changes over its life cycle. For example, users of the device may customize the device according to their preferences by storing additional personal information (e.g. adding a personal phonebook) or manipulating the factory preset information (e.g. replacing the factory wallpaper with a personal photo, installing additional applications).

In some circumstances, the mobile communication device may be reassigned, passed-on, or otherwise repurposed for a variety of reasons. In such circumstances and in other circumstances, it is desirable for content of the mobile communication device be reset to only contain specified preset content. For this purpose, the original equipment manufacturer (OEM) of the device usually provides one or more tools (e.g. software applications) that can modify the content of the mobile communication device. For example, the OEM content-modification tool may be resident on a computer and is operable to remove all content stored in a mobile communication device connected to the computer and reinstall the operating system for that device.

The content-modification tools supplied by the OEM are generally designed for the end-user. As such, the OEM content-modification tools are not designed, tested nor optimized for use by a user who wishes to modify the content of devices on a larger scale. For example, a user such as a refurbisher or a corporate technology deployment department may wish to bulk-process the modification of the content of the devices.

In the cases described above, the OEM content-modification tool may be found to be lacking for a number of reasons. For example, the OEM content-modification tool usually requires at least some input by an operator of the tool to complete the process of modifying the content of a connected mobile communication device. Generally, the operator input may be required at various stages of the process, which requires an operator to check on the system from time to time to provide the required input.

For some devices, more than one OEM content-modification tools may be required to complete the desired content modification process. For example, to reset the contents of a Blackberry™ device manufactured by Research In Motion inc. (RIM), several operations need to be performed using several tools. This again would require input by the operator to complete the process.

In yet another example, the data communication between the mobile communication device and the computer where the OEM content-modification tool is residing on may be lost. This could be due to issues on the computer (e.g. driver conflicts) or from execution of an operation by the OEM content-modification tool (e.g. removing the operating system from the device would cause the device to be reset, which cause the connection to the computer to be lost). In these cases, an operator is required to re-establish the connection. This may involve the operator having to physically unplug the device and reconnect the device to the computer to re-establish connection. In addition, connection between the device and the computer can be lost at multiple times during the process, which requires the operator to intervene at multiple times for the process to complete successfully. To further complicate matters, if a mobile communication device is unplugged as the process to modify the content is being modified, there is a risk that the device will lose its functionality, resulting in a "bricked" phone.

In view of the above, there is a need for a system and method to modify the content of mobile communication devices that address at least some of the above noted concerns

SUMMARY OF THE INVENTION

According to one aspect, there is provided a computer-implemented method for modifying content of mobile communication devices. The method includes the steps of establishing a data communication between at least one mobile communication device from at least one manufacturer and a coordinating computer, the at least one mobile communication device having content stored therein, providing at least one content-modification module for each of the at least one mobile communication device, the content-modification module comprising a plurality of operations that are executable to modify the content of that mobile communication device, providing at least one device-specific modification procedure for that mobile communication device, the modification procedure comprising one or more selected operations of the plurality of operations of the content-modification module and an order of execution of the one or more selected operations, and executing at least one operation of the selected operations based on the at least one device-specific modification procedure to modify the content of that mobile communication device.

According to another aspect, there is provided a system for modifying content of mobile communication devices including at least one coordinating computer having a coordinating processor and at least one hardware connection module operatively coupled thereto, the hardware connection being connectable to at least one mobile communication device and establishing a data communication therebetween. The coordinating processor is operable to provide at least one content-modification module for each of the at least one mobile communication device, the content-modification module comprising a plurality of operations that are executable to modify the content of that mobile communication device, provide at least one device-specific modification procedure for that mobile communication device, the modification procedure comprising one or more selected operations of the plurality of operations of the content-modification module and an order of execution of the one or more selected operations, and execute at least one operation of the selected operations based on the at least one device-specific modification procedure to modify the content of that mobile communication device.

According to another aspect of the invention, there is provided a non-transitory computer readable medium having instructions for modifying of content of mobile communication devices. The instructions are executable by a processor to provide at least one content-modification module for each of the at least one mobile communication device, the content-modification module comprising a plurality of operations that are executable to modify the content of that mobile communication device, provide at least one device-specific modification procedure for that mobile communication device, the modification procedure comprising one or more selected operations of the plurality of operations of the content-modification module and an order of execution of the one or more selected operations, and execute at least one operation of the selected operations based on the at least one device-specific modification procedure to modify the content of that mobile communication device.

Other aspects and features of the invention will become apparent, to those ordinarily skilled in the art, upon review of the following description of some exemplary embodiments.

BRIEF DESCRIPTION OF THE DRAWINGS

The drawings included herewith are for illustrating various examples of methods and apparatus of the present specification and are not intended to limit the scope of what is taught in any way. In the drawings.

DETAILED DESCRIPTION OF THE INVENTION

Figure 1:
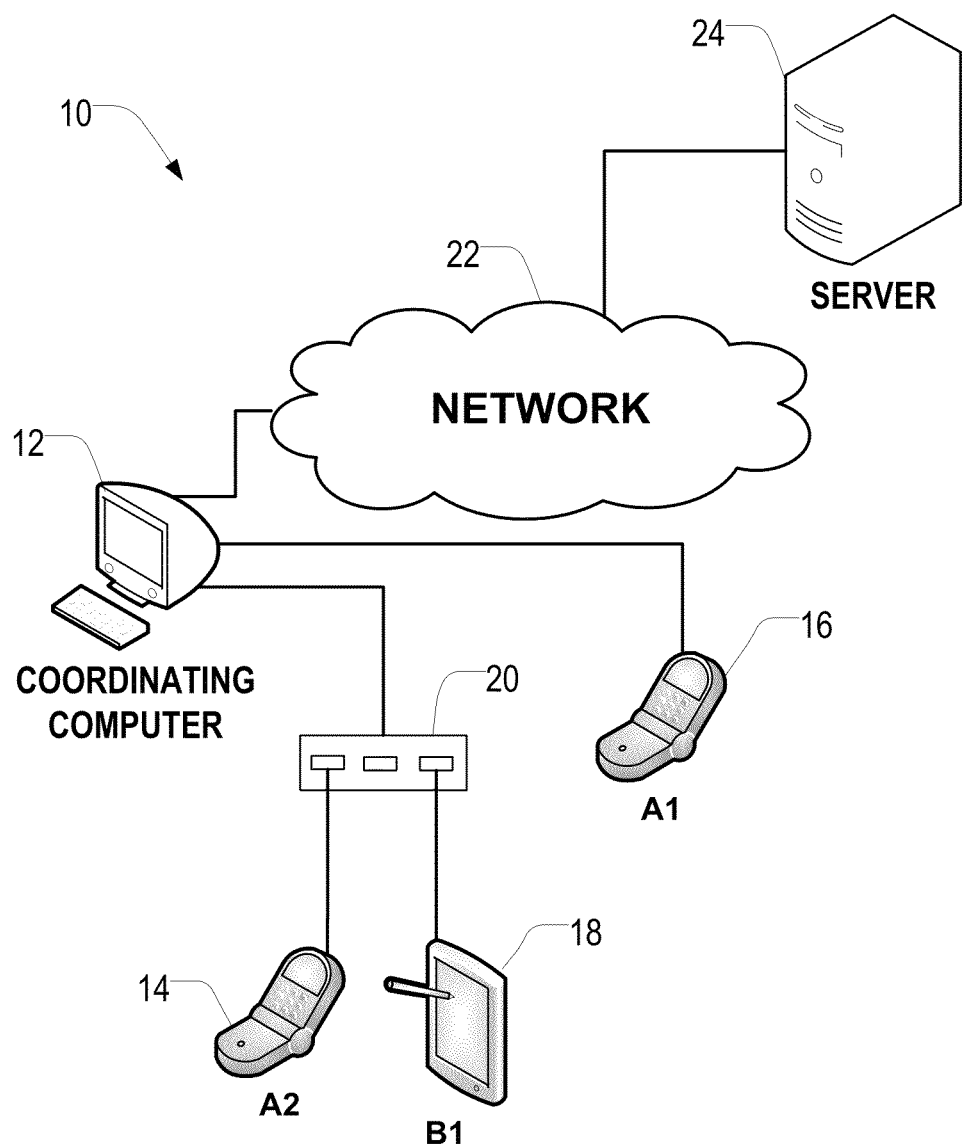
FIG. 1 is a schematic diagram of a system for modifying content of mobile communication devices according to one embodiment of the invention.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, slate/tablet/pad-form computers, smart phone, or cellular telephone. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

The embodiments described herein relate to batch processing of mobile communication devices. In particular, the described embodiments relate to modifying the content of multiple mobile communication devices of one or more type from one or more manufacturers that is implementable in an automated manner without requiring any input from a human operation generally, once the process to modify the content is initiated.

These embodiments could be deployed by an entity that refurbishes mobile devices, a corporate technology-deployment department, or any other entity that wishes to batch-process content of mobile communication devices.

The term "content" as used herein should be understood to include any information stored on the mobile communication device. For example and without limitation, the term content includes the operating system resident on the devices as well as any other content including various user data, user customizations and device resident applications.

The term "modification" as used herein should be understood to mean performing one or more operations on the content of the devices, even if the content of a given device after a number of operations is the same as the content of that device before the performance of the operations. For example, performing operations to remove and reinstall the operating system in a given device should be understood as modifying the content of the given device, even if the end-result content of the operations is the same as the content before the operations were executed. The acts of removing and reinstalling the operating system in themselves are of value as they provide a measure of assurance that the operating system of the device is as intended.

Referring now to FIG. 1, illustrated therein is a system 10 for modifying content of mobile communication devices according to one embodiment of the invention. In the embodiment as shown, the system 10 comprises a coordinating computer 12 connected mobile communication devices 14, 16, and 18. In particular the coordinating computer 12 is connected to mobile devices A2 and B1 through a connection hub 20, and directly to the mobile communication device A1. The coordinating computer 12 is also connected to a network 22, and through the network 22 to a server 24.

The mobile communication devices 14, 16 and 18 will sometimes be referred to herein as "the device(s)". The devices 12, 14 and 16, for example and without limitation, may be cellular phones, smart phones, tablet/slate computers, and/or eBook readers.

The device 14 and 16 are type "A" devices and the device 18 is a type "B" device. The terms types "A" and "B" refer to make and model of the device. For example, as shown, the devices 14, and 16 could be two phones of a particular model from a first manufacturer while the device 18 is a tablet computer from another manufacturer. In other embodiments, the devices could be different models from different manufacturers.

The devices 14, 16 and 18 may be running various operating systems, which may be model-specific, manufacturer-specific (e.g. iOS developed by Apple Computer Inc.), and/or operating systems that are not restricted to a particular device or a manufacturer (e.g. Android operating system developed by Google Inc.).

In the embodiment as shown, the connection between the coordinating computer 12 and each of the devices 14, 16, 18 is facilitated through hardware compliant with the Universal Serial Bus ("USB") specification. The coordinating computer 12 includes a hardware connection module (not shown) such as an USB connection port and appropriate USB drivers software to support data communication through the USB connection port. The USB drivers may be provided to the coordinating computer 12 as part of an operating system for the coordinating computer 12. For example, the USB drivers may be provided as part of Windows™ or UNIX™ operating systems. The system 10 also comprises an external connection module, namely the connection hub 20. The connection hub 20 may be a powered or un-powered USB hub. USB cables are used to connect the coordinating computer 12, the devices 14 and the connection hub 20.

In other embodiments, the connection between mobile communication devices and the coordinating computer 12 could be facilitated through other types of wired or wireless connections such as IEEE 802.11 standard ("WiFi"), Blue-Tooth™, cellular data network, infrared, IEEE 1394 serial bus or any other data communication means.

Figure 2:
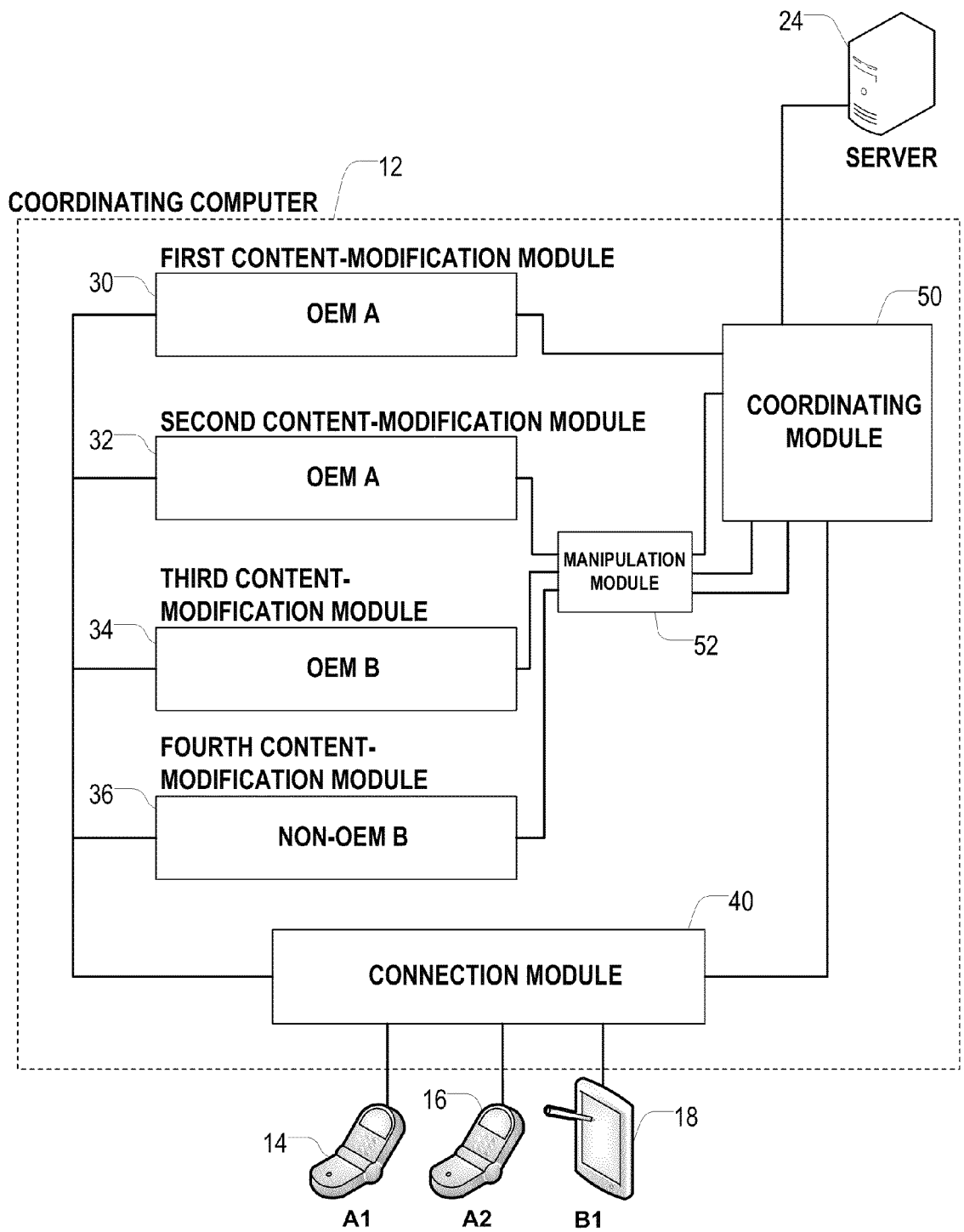
FIG. 2 is a block diagram illustrating various modules of the coordinating computer shown in FIG. 1.

Referring now to FIG. 2, illustrated therein is a block diagram of exemplary modules of the coordinating computer 12. While the modules are located at the coordinating computer 12 in this embodiment, it is possible for one or more of these modules to be located at other components of the system 10 in other embodiments.

As shown, the coordinating computer 12 includes content-modification modules, namely, a first content-modification module 30, a second content-modification module 32, a third content-modification module 34, and a fourth content-modification module 36. The first content-modification module 30 and the second content-modification module 32 are developed or distributed by an original equipment manufacturer (OEM) or under authorization of the OEM of the type "A" devices 14 and 16. The third content-modification module 34 is provided by an OEM "B" of the type "B" device 18. The fourth content-modification module 36 is provided by an entity other than the OEM of the type "B" device 18. In other embodiments, number and source of the content-modification modules may vary.

Each of the content-modification modules 30, 32, 34, 36 is a software product that can modify the content of the device. For example, one of the content-modification modules 30, 32, 34, 36 may be ITunes™ software developed and distributed by Apple inc., which may be used to modify content of various mobile communication devices manufactured by Apple inc. such as the iPhone™ or the iPad™. In another example, one of the content-modification modules 30, 32, 34, 36 may be the Blackberry™ desktop manager software produced by Research in Motion inc. (RIM) for its Blackberry™ devices. In another example, one of the content-modification modules 30, 32, 34, 36 may be an application programming interface (API) for a particular device. For example, the content-modification module 30 may be the Blackberry™ Javaloader tool provided by RIM to perform various administrative tasks on a Blackberry™ device.

In the embodiment as shown, the first and second content-modification modules 30, 32 are software applications that are provided by the manufacturer of the devices 14, 16 to modify the content of the devices of that type. Similarly, the third content-modification modules 34, 36 are software applications provided by OEM for the device of type "B" and a non-OEM third-party to modify the content of the devices of that type respectively.

Each of the content-modification modules 30, 32, 34, 36 comprises a plurality of operations that are executable to modify the content of the corresponding mobile communication devices 14, 16, 18. For example, the operations could include operations to install an operating system, update a current operating system, install one more applications, or perform other modification of the content of the devices The operations in each of content-modification modules 30, 32, 34, 36 may serve to perform different functionalities. In the current embodiment, executing one or more operations of the first content-modification module 30 removes the operating system and user content from devices of type "A" such as the devices 14 and 16, and executing one or more operations of the second content-modification module 32 reinstalls the operating system for these devices. One or more of the operations from the third content-modification module 34 may be executed to install a first application, and those from the fourth content-modification module 36 to install a second application.

Generally, the operations of each of the content-modification must be executed in a specific order to modify the content the device. For example, to perform a reinstall of an operating system on a Blackberry™ device, the following operations must be executed in the given order: a "resettofactory" operation using the Javaloader tool, followed by a "wipe" command using the Javaloader tool, and reinstalling the operating system to the device using the Blackberry™ desktop manager software. In another example, to perform a reinstall of an operating system on a Blackbery device that has a operations system version prior to version 4.5, the following operations must be executed in the given order: a "wipe" command using the Javaloader tool, followed by reinstalling the operating system to the device using the Blackberry™ desktop manager software, and a "resettofactory" operation using the Javaloader tool.

The order of execution of the operations may be specific to a particular mobile communication device and a particular desired modification (i.e. desired functionality). For example, a given content-modification module may comprise a plurality of operations to modify content in a plurality of devices. However to achieve a desired modification of content of a particular device, it may be necessary for a subset of the operations be selected and executed in a given order.

The content-modification modules 30, 32, 34, 36 are also connected to a connection module 40. The connection module 40 facilitates data communication between the devices 14, 16, 18 and the coordinating computer 12 such that the content-modification modules 30, 32, 34, 36 can send appropriate instructions associated with various operations to the mobile devices 14, 16, 18 to modify the content stored therein.

The connection module 40, in this embodiment, comprises software USB drivers and USB connection management tools provided by the operating system of the coordinating computer 12 to manage the hardware associated with the connection module 40. For example, if the coordinating computer 12 is running a Windows™ operating system, the connection module 40 could be the USB controllers that are accessible through the "Device Manager" interface or though various command prompt operations. In other embodiments, the connection module 40 could be any other operating system specific application that facilitates data communication between the mobile communication devices 14, 16, 18 and the coordinating computer 12 through the hardware connection module.

The coordinating computer 12 also comprises a coordinating module 50 connected to the content-modification modules 30, 32, 34, 36. The coordinating module 50 is operable to interface with each of the content-modification modules 30, 32, 34, and 36, and execute the operations of these modules to modify contents of the connected devices.

To execute the operations of the content-modification modules 30, 32, 34, 36, the coordinating module 50 interfaces with these content-modification modules 30, 32, 34, 36. In the embodiment as shown, the coordinating module 50 interfaces directly with the first content-modification module 30, and interfaces indirectly with the second, third and fourth content-modification modules 32, 34 and 36 through a manipulation module 52.

The manipulation module 52 is a tool that facilitates manipulation of the interfaces of other applications such as the content-modification modules 32, 34, 36. The manipulation module 52 may be another software application, or a scripting language. For example, if the content-modification modules 32, 34, 36 are operating in a Windows™ environment, a freeware scripting language entitled AutoIt could be used to manipulate the interfaces of the windows-based content-modification modules. The AutoIt tool can be used, for example, to click buttons, extract information from text fields and lists, and recognize and deal with error conditions that may be present in the content-modification modules 32, 34, 36.

The coordinating module 50 interfaces directly with the content-modification module 30. Staying with the example that the content-modification module 30 is the Blackberry™ Javaloader tool, the coordinating module 50 comprises various command-line operations to use the Javaloader tool to perform various functionalities. For example, the Javaloader tool may be used to perform a wipe of the connected devices 14, 16, determine whether the data communication between the coordinating computer 12 and the devices 14, 16 are available, determine the model of the device, version of operating system installed, and which carrier the devices 14, 16 are associated with.

The coordinating module 50 is also connected to the connection module 40 such that the coordinating module 50 may monitor the data communication between one or more of the devices 14, 16, and 18 and the coordinating computer 12.

The coordinating module 50 is also operable to re-establish the data communication by executing at least one operation in the coordinating computer 12. For example, if the coordinating computer 12 is a Windows™ operating system environment, the coordinating module 50 may use a native tool "devcon.exe" which provides command-line interface to the connection module 40 (e.g. Device Manager). This tool could be used to reset the connection drivers (e.g. USB drivers) for each device 14, 16, 18 and the connection hub 20, either individually or in batch.

As some operations could conflict with other operations, it is necessary to coordinate the activities. For example, if one of the operations of one of the content-modification modules 30, 32, 34, 36 is in the process of executing an operation, resetting the connection between the devices 14, 16, 18 and the coordinating computer 12 while the execution is in progress may result in the device having a corrupted operating system (e.g. a "bricked" device). As such, the coordinating module 50 monitors and coordinates the activities of the content-modification modules 30, 32, 34, 36 and the coordinating computer 12.

As stated above, the operations of the content-modification modules 30, 32, 34, 36 are generally required to be executed in a specified order to achieve desired result (i.e. modification of the content of the attached device). The coordinating computer 12 comprises device-specific modification procedure for each type of the mobile communication devices 14, 16, 18 connected to coordinating computer 12. The device modification procedure includes one or more selected operations of the plurality of operations of one or more of the content-modification modules 30, 32, 34, 36 and order of execution of the selected operations. The selected operations and order of execution of the selected operations may vary based on the desired modification (e.g. install application vs. install operating system) and/or the device type (e.g. type "A" vs. type "B").

The device-specific modification procedure may be stored on the server 24. The server 24 may be a web server connectable to the coordinating computer 12 through the Internet. For example, the server 24 may be a cloud service. When a given device is connected to the coordinating computer 12, the coordinating computer 12 might determine the type of the device that is connected (e.g. device types "A" or "B"), the content modification that is desired (e.g. reinstall OS, install applications) and whether there is a corresponding device-specific modification procedure for that device for that desired modification. The coordinating computer 12 may then retrieve the necessary device-specific modification procedure from the server 24 if it is not already present in the coordinating computer 12.

Figure 3:
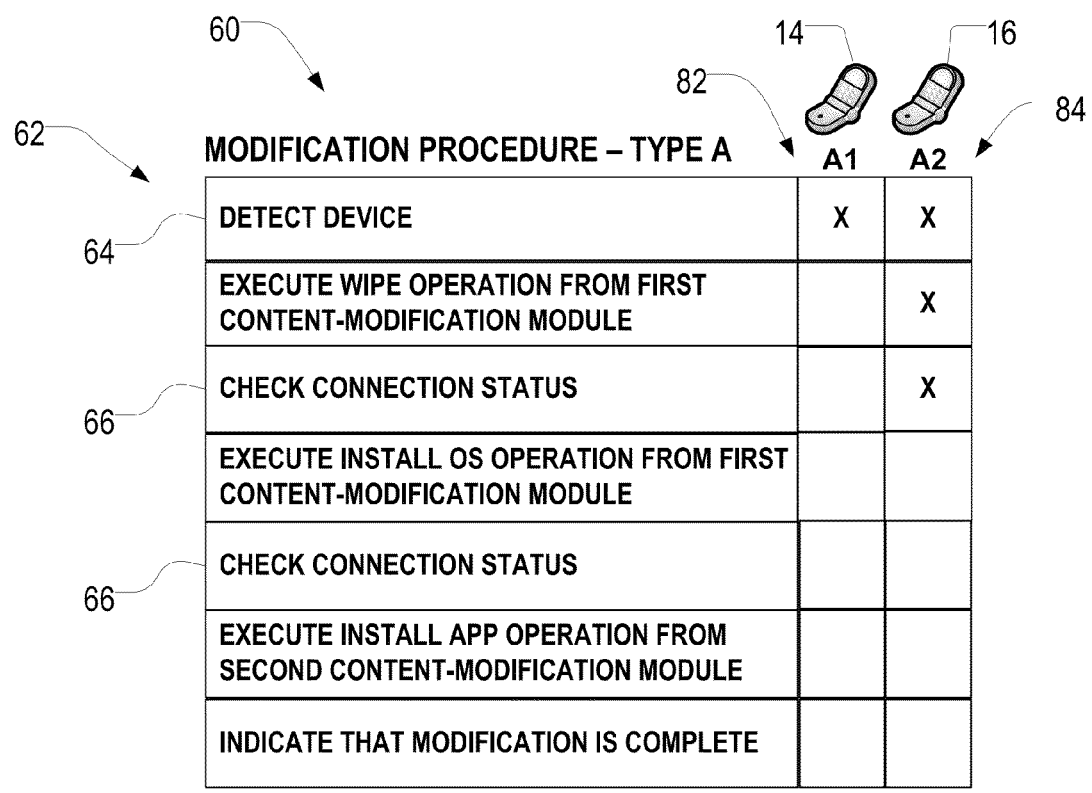
FIG. 3 is a block diagram of an exemplary device-specific modification procedure and information about completed operations for devices A1 and A2 shown in FIG. 1.
Figure 4:
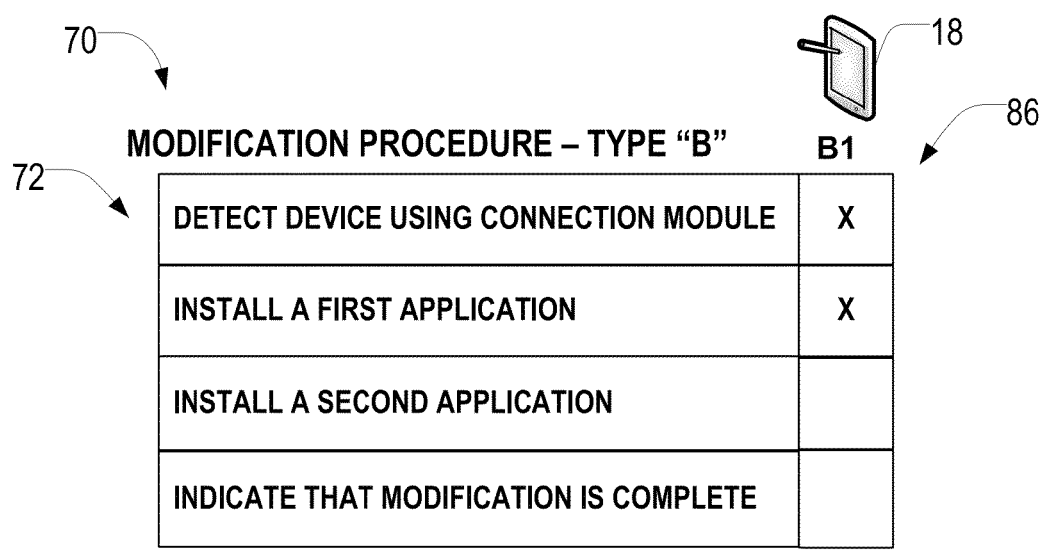
FIG. 4 is a block diagram of an exemplary device-specific modification procedure and information about completed operations for device B1 shown in FIG. 1.

Referring now to FIGS. 3 and 4, illustrated therein are exemplary device-specific modification procedures 60 and 70 for devices of type "A" (devices 14, 16) and devices of type "B" (e.g. device 18). The procedure 60 is directed to removing the installed operating system and user content from the devices 14, 16, reinstalling the operating system, and loading a selected application to the same. The procedure 70 is directed to installing a first and second application to the devices of type B (i.e. the device 18).

The modification procedure 60, as shown, includes a plurality of selected operations generally indicated by the reference numeral 62, that are to be executed on content-modification modules 30, 32 to perform the modification stated above. The plurality of selected operations are selected from each of the content-modification modules 30, 32. As shown, the selected operations are to be performed in a serial order, from the top of the list to the bottom of the list. In other embodiments, the order of performance of some of the selected operations may differ without affecting the outcome of the procedure. For example, if installing more than one application, it is generally possible to install the applications in any order, provided that the applications are not dependent on one another.

Modification procedures other than the modification procedure 60 may have different sets of operations. For example, other modification procedures may include different selected operations from the same and/or different content-modification modules, and the order of performance of the selected operations may also differ. As shown, the device-specific modification procedure 70 includes operations 72 that are different than that of the procedure 60.

The operations as shown in the example are at a high-level for illustrative purposes. Generally, each operation may further include a series of sub-steps. For example, the detect device operation 64 may involve sending a command to the connection module 40 to obtain a list of devices in data communication with the coordinating computer 12, determine whether any of the devices are devices of type A, and determine whether the specific device 14 or 16 is in data communication.

Similarly, the operation 66 to check connection status may include a plurality of sub-steps. For example, the operation 66 may include the sub-steps of generating a command for one of the operations of the content-modification module 30 to detect the connected device 14, or 16, executing the command, waiting for a response from the device, if the response indicates the device is not detected, waiting for a specific period of time and/or sending a command to the connection module 40 to restart the USB driver corresponding to that device, and repeating one or more of these steps until the data communication between the device 14 or 16 and the coordinating computer 12 is confirmed.

The operation 66 check connection status may be understood as monitoring the data communication between the device and the coordinating computer 12. Monitoring the data communication may be particularly helpful in cases wherein one or more of the executed selected operations will restart the device, causing the data communication between the device and the coordinating computer 12 to be lost. In some cases, the connection may re-establish itself. However, in other cases, the data communication may not re-establish itself for a variety of reasons. In such cases, it may be necessary to execute a command in the coordinating computer 12 to re-establish the data communication. For example, a connection driver in the connection module 40 may be reset to force it to re-establish the data communication between the device and the coordinating computer 12. Additionally, these steps could be automated, that is, performed without input from a human operator.

The system 10 is operable to modify the content multiple devices 14, 16, 18 of different types and different manufacturers simultaneously. The coordinating module 50 may assign a unique identifier to each of the devices 14, 16, 18 that are connected to the coordinating computer 12. The unique identifier could be used to track the progress of the device-specific modification procedure. For example as shown in FIGS. 1, 3, and 4, unique identifier A1 has been assigned to the device 14, A2 to the device 16 and B1 to the device 18.

Referring back to FIGS. 3 and 4, the coordinating module 50 also records information about at least one selected operation that has been executed for a particular device. For devices A1 and A2, the recorded information about the executed selected operations are shown generally by reference numerals 82 and 84 in FIG. 3, and for the device B1, the recorded information is shown generally by reference numeral 86 in FIG. 4. Recording the selected operations that have been executed for the devices allows the coordinating module 50 to track the progress of the modification procedures for each of the devices. By tracking the progress of the modification procedures, the coordinating module 50 may resume the procedure at an appropriate selected operation should the data communication between the coordinating computer 12 and the devices 14, 16, 18 are interrupted and re-established without requiring input from a human operator. That is, after the data communication is re-established between one of the devices 14, 16, 18 and the coordinating computer 12, the coordinating module 50 may determine a next operation of the plurality of operations to be executed based on the modification procedure and the recorded information about the operations that had been executed for that device 14, 16, or 18.

Figure 5:
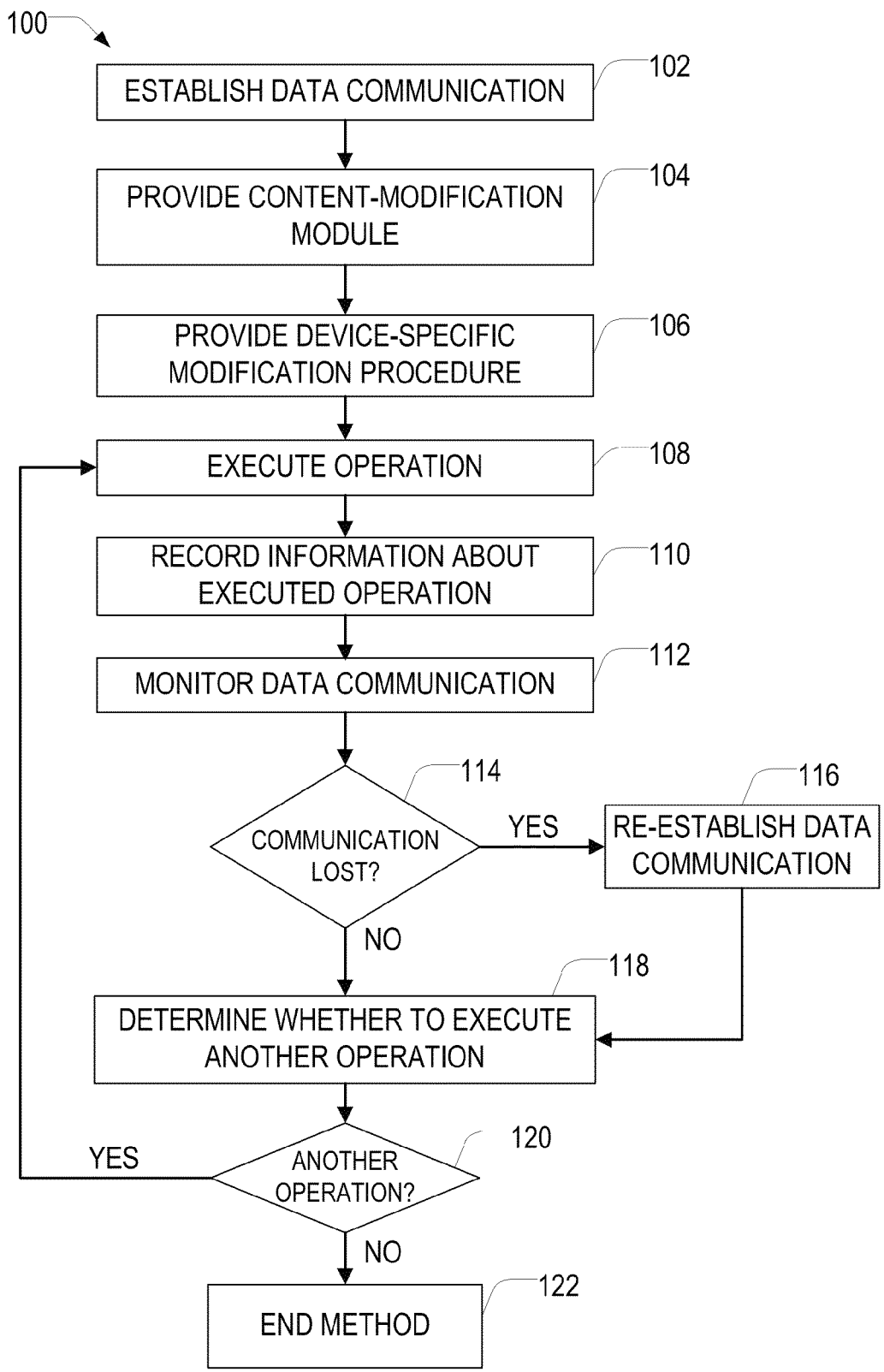
FIG. 5 is a block diagram illustrating the steps for a method for modifying content of mobile communication devices according to another embodiment of the invention.

Referring now to FIG. 5, illustrated therein is a computer-implemented method 100 for modifying the content of mobile communication devices according to an embodiment of the invention. One or more of the steps of method 100 may be automated. That is, one or more of the steps of these methods may be implemented and performed without requiring any input from a human operator. The method 100 may be executed by a computer. For example and without limitation, the method 100 may be executed by the coordinating computer 12 as described hereinabove.

The method 100 begins at step 102. At step 102, the data communication between at least one mobile communication device from at least one manufacturer and a coordinating computer is established. The step 102 may include connecting the mobile communication device to a connection module. The connection module facilitates data communication between the at least one mobile communication device and the coordinating computer. The connection may be one or more wired/wireless hardware connection module, located within the coordinating computer and/or external to the coordinating computer. The step 102 may also include assigning a unique identifier to the at least one mobile communication device in data communication with the coordinating computer.

At step 104, at least one content-modification module from the at least one manufacturer for each of the at least one mobile communication device is provided. The content-modification module comprises a plurality of operations that are executable to modify the content of that mobile communication device. The step 104 may include the step of retrieving the at least one content-modification module from a network resource. For example and without limitation, the at least one content-modification module may be the content-modification modules 30, 32, 34 and/or 34 described herein above.

At step 106, at least one device-specific modification procedure for that mobile communication device is provided. The modification procedure comprises one or more selected operations of the plurality of operations of the content-modification module and an order of execution of the one or more selected operations. For example and without limitation, the at least one device-specific modification procedure may be the device-specific modification procedure 60 and 70 as described above.

At step 108, at least one operation of the selected operations is executed in the order of execution provided to modify the content of that mobile communication device. Depending on the type of the content-modification module, the step 108 may include using a manipulation module to manipulate an interface of the content-modification module, and/or generating and executing command prompt commands. For example and without limitation, the executed operation may be the operations 62 or 72 described above.

At step 110, information about the executed selected operation at step 108 is recorded. For example and without limitation, the recorded information about the executed selected operation may be the recorded information indicated by reference numeral 82 described above and shown in FIG. 3.

At step 112, the data communication between the at least one device and the coordinating computer is monitored to determine whether the data communication to the at least one mobile communication device is lost. This step may comprise executing one of the selected operations at the at least one content-modification module and/or at connection module of the coordinating computer. In other embodiments, the data communication may be monitored by checking the connection module at defined intervals. The intervals may be defined based on temporal considerations (e.g. time elapsed since the last check). The intervals may also be defined based on one or more of the selected operations that were executed. For example, if it is known that execution of a given selected operation entails the risk of the data communication being lost, the data communication may be monitored after each execution of that operation.

At step 114, it is determined whether the data communication between the at least one mobile communication device and the coordinating computer is lost. If it is determined that the data communication is lost, the method proceeds to step 116. If the data communication is active, the method proceeds to step 118.

At step 116, the data communication is re-established by executing at least one operation in the coordinating computer. The data communication is re-established without manipulating a physical connection between the at least one mobile communication device and the coordinating computer. For example and without limitation, the data communication can be re-established by executing one or more selected operations at least one content-modification module and/or execution one or more connection module operations at the connection module. After the data communication is re-established, the method 100 proceeds to step 118.

At step 118, it is determined whether to execute another operation of the selected operations based on the device-specific modification procedure and the information about at least one operation that has been executed.

If it is determined that there is another selected operation is to be executed, the method 100 returns to step 112 to execute that operation. If there are no more additional selected operations to be executed, the method ends at step 122.

The foregoing aspects of the method and the electronic device are provided for exemplary purposes only. Those skilled in the art will recognize that various changes may be made thereto without departing from the spirit and scope of the method and the electronic device as defined by the appended claims.

The invention claimed is:

1. A computer-implemented method for refurbishing a batch of mobile communication devices having content stored therein, by modifying the content of mobile communication devices, comprising the steps of:
   a) establishing a data communication between each of the mobile communication devices and a coordinating computer, the batch of mobile communication devices comprising different types of mobile communication devices, the content comprising an operating system and user content, the coordinating computer being configured for modifying the content of the different types of mobile communication devices so as to provide batch processing of the different types of mobile communication devices, by:
   b) accessing at least one content-modification module for each of the different types of mobile communication devices, each of the content-modification modules being provided by the coordinating computer and comprising a plurality of operations that are executable to modify the content of a selected one of the different types of mobile communication devices, wherein the plurality of operations includes removing the operating system and removing the user content so as to refurbish the selected one of the different types of mobile communication devices;
   c) selecting at least one device-specific modification procedure for each of the different types of mobile communication devices, the at least one device-specific modification procedure being provided by the coordinating computer and comprising one or more selected operations of the plurality of operations of the content-modification module and an order of execution of the one or more selected operations; and
   d) executing at least one operation of the selected operations based upon the at least one device-specific modification procedure and the order of execution for each of the different types of mobile communication devices so as to modify the content of each of the different types of mobile communication devices.

2. The method of claim 1, further comprising the steps of:
   a) monitoring the data communication between the mobile communication devices and the coordinating computer to determine whether the data communication between the mobile communication devices and the coordinating computer is lost; and
   b) if it is determined that the data communication is lost, re-establishing the data communication by executing at least one operation in at least one of the coordinating computer and the content-modification modules, the data communication being re-established without manipulating a physical connection between the mobile communication devices and the coordinating computer.

3. The method of claim 2, further comprising the steps of:
   a) recording information about at least one selected operation that has been executed;
   b) after the data communication is re-established, determining whether to execute another selected operation based on the at least one device-specific modification procedure and the information about the at least one operation that has been executed;
   c) if it is determined that another selected operation is to be executed, executing that operation.

4. The method of claim 2, further comprising the step of providing a unique identifier associated with each of the mobile communication devices, wherein the unique identifier is used to record the information about the operations that have been executed for each device.

5. The method of claim 2, wherein the step of monitoring the data communication between the mobile communication devices and the coordinating computer comprises the step of checking a connection module of the coordinating computer at defined intervals.

6. The method of claim 3, wherein performance of the steps of the method are automated such that input from a human operator is not required to execute any of the steps.

7. The method of claim 5, wherein, the intervals are defined based on at least one of:
   a) temporal considerations; and
   b) at least one operation of the selected operations that has been executed for that device.

8. The method of claim 1, wherein the different types of mobile communication devices from the at least one manufacturer comprise a plurality of mobile communication devices from a plurality of manufacturers.

9. The method of claim 1, wherein at least one of the content-modification modules is developed by at least one of: an original equipment manufacturer (OEM) for the mobile communication devices and an entity other than the original equipment manufacturer.

10. The method of claim 1, wherein the step of executing one of the selected operations comprises at least one of:
    a) using a manipulation module to manipulate an interface of the content-modification module; and
    b) generating and executing command prompt commands.

11. The method of claim 1, wherein the step of accessing the content-modification modules comprises determining the type of the mobile communication device that is connected to the coordinating computer, and obtaining the content-modification module for that type of mobile communication device from a network resource.

12. A system for refurbishing a batch of mobile communication devices having content stored therein by modifying the content of the mobile communication devices, comprising:
   a) at least one coordinating computer having a coordinating processor and at least one hardware connection module operatively coupled thereto, the hardware connection module being connectable to the mobile communication devices and establishing a data communication therebetween, the batch of mobile communication devices comprising different types of mobile communication devices, the content comprising an operating system and user content;
   b) wherein the coordinating processor is configured to modify the content of the different types of mobile communication devices so as to provide batch processing of the different types of mobile communication devices, by:
      i. accessing at least one content-modification module for each of the different types of mobile communication devices, each of the content modification modules being provided by the coordinating computer and comprising a plurality of operations that are executable to modify the content of a selected one of the different types of mobile communication devices, wherein the plurality of operations includes removing the operating system and removing the user content so as to refurbish the selected one of the different types of mobile communication devices;
      ii. selecting at least one device-specific modification procedure for each of the different types of mobile communication devices, the modification procedure being provided by the coordinating computer and comprising one or more selected operations of the plurality of operations of the content-modification module and an order of execution of the one or more selected operations; and
      iii. executing at least one operation of the selected operations based upon the at least one device-specific modification procedure and the order of executing for each of the different types of mobile communication devices so as to modify the content of each of the different types of mobile communication devices.

13. The system of claim 12, wherein the coordinating processor is further operable to:
   a) monitor the data communication between the mobile communication devices and the coordinating computer to determine whether the data communication between the mobile communication devices and the coordinating computer is lost; and
   b) if it is determined that the data communication is lost, re-establish the data communication by executing at least one operation in at least one of the coordinating computer and the at least one content-modification module, the data communication being re-established without manipulating a physical connection between the mobile communication devices and the coordinating computer.

14. The system of claim 13, wherein the coordinating processor is further operable to:
   a) record information about at least one selected operation that has been executed;
   b) after the data communication is re-established, determine whether to execute another selected operation based on the device-specific modification procedure and the information about the at least one operation that has been executed; and
   c) if it is determined that another selected operation is to be executed, execute that operation.

15. The system of claim 13, wherein the at least one hardware connection module comprises a wireless connection port.

16. The system of claim 13, wherein the at least one hardware connection module comprises a wired connection port.

17. The system of claim 16, wherein the wired connection port comprises at least one of:
   a) a universal serial bus port on the coordinating computer; and
   b) a universal serial bus hub connected to a universal serial bus port on the coordinating computer.

18. A non-transitory computer readable medium comprising instructions for refurbishing a batch of mobile communication devices having content stored therein, by modifying the content of the mobile communication devices, the batch of mobile communication devices comprising different types of mobile communication devices, the content comprising an operating system and user content, the instructions being executable by a processor to modify the content of the different types of mobile communication devices so as to provide batch processing of the different types of mobile communication devices, by:
   a) accessing at least one content-modification module for each of the different types of mobile communication devices, each of the content-modification modules being provided by a coordinating computer and comprising a plurality of operations that are executable to modify the content of a selected one of the different types of mobile communication devices, wherein the plurality of operations includes removing the operating system and removing the user content so as to refurbish the selected of the different types of mobile communication devices;
   b) selecting at least one device-specific modification procedure for each of the different types of mobile communication devices, the modification procedure being provided by a coordinating computer and comprising one or more selected operations of the plurality of operations of the content-modification module and an order of execution of the one or more selected operations; and
   c) executing at least one operation of the selected operations based upon the at least one device-specific modification procedure and the order of execution for each of the different types of mobile communication devices so as to modify the content of each of the different types of mobile communication devices.

* * * * *